Patented June 7, 1927.

1,631,628

UNITED STATES PATENT OFFICE.

HARRY C. FISHER, OF CINCINNATI, OHIO, ASSIGNOR TO THE RICHARDSON COMPANY, OF LOCKLAND, OHIO, A CORPORATION OF OHIO.

COLORING GRANULATED MINERAL, PARTICULARLY SLATE.

No Drawing.   Application filed July 21, 1925.   Serial No. 45,133.

My invention relates to processes of coloring material that is primarily intended for imposition upon composition roofing, this material ordinarily being composed of granulated slate or minerals having a like fracture tendency.

Due to the demands of temperatures and necessities of treatment, it is not possible to apply coloring matter by my process to materials having slate-like fracture in large sizes, as the temperatures would destroy their shape, causing them to break up.

The objects of my invention are the production of a color on the surface of mineral and slate granules which will be practically permanent and non-fading, and will be resistant to the effects of exposure to varied atmospheric conditions.

I am aware that silicate paints have been employed in the past for coloring surfaces of materials, and that sometimes a mild heat has been used in connection with the incorporation of pigmented mediums to mineral bodies.

The problems involved and the solution of which form the basis of this invention, are the provision of colors on slate and mineral granules by the use of a silicate, that is to say a solution of silicate with which the granules are coated, but which is subsequently rendered insoluble in water by a rapid heat treatment, as distinguished from chemical treatment; and the use of pigments for these colors which are suspended rather than dissolved at least in the initial stages of my process at normal or roasting temperatures.

In coloring mineral materials to produce shades of blue, green, and purple, bluish grays and the like, I have not found it economical to use a silicate soluble material of satisfactory nature.

The pigment which I find will give the best action in this regard is ultramarine blue although I do not wish to limit myself to this particular pigment, as in certain respects my invention involves the use of pigment in general, and in certain other respects a manner of handling pigments which are, or appear to be, initially insoluble in hot or cold silicate or water.

The coloring agencies produced by my invention are not formed as a true colored glass but as a glassy insoluble substance of a certain quality, which holds in suspension or holds against the mineral granules a pigmenting body which shows through the translucent substance, and in its surface. I wish to use the word suspension in an explanatory rather than a limiting sense. The action of pigments in silicates at the high temperatures used is little understood, the art being newly developed by me, and it is possible that some sintering or fusion takes place, even to the extent of producing minute quantities of true colored glasses.

Ultramarine blue is a member of a group of ultramarine pigments which exist as impalpable powders, insoluble in water. The elements sodium, aluminum, silicon, sulphur, oxygen and others, exist in the pigments in various complex compounds, the exact nature of which is not known. Green, white, yellow and violet ultramarines exist.

Ultramarine is not changed by alkalis, but dilute acids readily decompose it. Heating to redness causes ultramarine to lose its brilliancy, and to become greenish, but there is no other noteworthy change. It possesses hydraulic properties and so increases the binding power of cement. As a body color ultramarine is used in cloth printing, for colored writing paper and for preparing blue pigments in a suitable body. It is also used as bluing, for whitening paper and fabrics.

Since the temperatures used are around the initial stages of red heat in my process, it would be deductively supposed that the use of ultramarine would result in a false color due to the effect of heat. The silicate, however, exerts a protective effect on the pigment which it contains, even to the extent in some cases of making possible the production of a color from a pigment which would be entirely destroyed at the heats used except for the protective coating of the silicate. Nevertheless, I find that a considerable color change does take place and that the color change is more marked at or near the surface of the silicate. I compensate for such color changes by using only those ultramarines which under the conditions of temperature and silicate used will exhibit a color change resulting in the desired shade. To a certain extent also I can vary the color change by adjusting the roasting temperatures.

Also due to the rapidity which demands of economy place upon my process, and the insoluble chemically inert pigments, and due to the agitation which is required to thoroughly wet the slate, keep the pigments in suspension, and prevent a permanent balling up of the silicate coated granules, it is not possible to produce a transparent glaze.

However, I find that a white or snowy dehydrated silicate, in which are imprisoned particles of insoluble pigment of the character of ultramarine, acts to obscure the drab color produced in the slate by roasting, and gives a very pleasing blue, green or purplish effect, according to the formulæ which are used, and several of which will now be pointed out.

For making green slate in granular form into blue slate, I will give a formula in small quantities which can be enlarged as much as desired: Prepare a solution of 28 grams of commercial sodium silicate (I prefer a silicate of $1Na_2O$ to $3.25SiO_2$) in 100 cubic centimeters of water. Add 10 grams of dry ultramarine blue pigment, and stir until the pigment is thoroughly dispersed in the solution. Place the slate into the solution, keeping up agitation, so that the slate takes up the solution. I find that in the proportions given and the granulated slate available for composition roofing purposes, about 500 grams of slate will be all that can be properly coated. The mixing at this stage in commercial practice will be described below.

Commercially the mixing of the slate and silicate solution is followed by moving the product with agitation through a kiln, in which temperature progressively raises as the slate moves toward the delivery end of the kiln.

The ultimate temperature is such as to bring the slate to a red heat, which such thermal tests as are practical with me, show to be a temperature of around 1100 degrees Fahrenheit, which may vary for different formulæ from 900 to 1200 degrees or even higher. The atmosphere will be oxidizing, preferably.

In making purple slate from green, the preliminary solution is the same except that one-third as much dry red iron oxide is added, as ultramarine. In the formula given this would be 3 and ⅓ grams of the oxide. The roasting treatment is the same, and the effect is a purple shade of very satisfactory appearance.

With a suitable proportion of silicate solution and slate, the heat treatment of the silicate in a typical kiln will take from five to fifteen minutes, depending on the rate of feeding the treated raw slate.

The product has the color characteristics noted, and the colors are permanently held by the silicate. The silicate is formed into a snowy white translucent glassy body, practically insoluble in water and impervious to atmospheric conditions, as when exposed to the weather on a roof.

There may be an early exudation of a white product when the colored particles are exposed to the weather, but this washes away and appears to be a sodium compound, such as sodium carbonate, the washing out of which leaves the dehydrated silicate in a harder and more permanent condition than before, judging from severe accelerated tests in the laboratory.

A green color can be produced by the use of yellow limonite plus ultramarine blue; and other combinations of varying character, using the ultramarine blue as a basic color, can be produced. It must be remembered that it is necessary to bake the silicate-treated slate at temperatures approaching 1200 degrees F., with a 1 to 3.25 silicate if the maximum degree of stability is to be obtained. Since limonite $2Fe_2O_3.3H_2O$, loses its water of hydration and changes into red iron oxide $Fe_2O_3$, at temperatures a few hundreds of degrees below the desirable red heats, a green produced on slate from it and ultramarine blue is deficient in weathering resistance. A very satisfactory green can be made by using green chromic oxide, which is unaffected by heat, the color being deepened by the addition of a little ultramarine blue.

As noted above, in some instances where a series of added pigments are used together with the ultramarine, there will be chemical changes in color of the other pigments, due to the effect of heating them in the kiln, and some pigments used with the ultramarine change color during the heating due to the presence of oxidizing or non-oxidizing atmospheres in the kiln, and other factors. Although the color of the slate resulting from the roasting is well obscured by the silicate condition, the formulæ given will have to be varied to get the same shades if red slate or brown slate is employed in the place of the green, which forms the best bases for blue color combinations, as the strong undertones of the former tend to show through the whitened silicate to some extent, and the pale green undertone of the natural green slate is more easily obscured.

The product is customarily used as a surfacing to be rolled onto a flexible composition sheet formed of asphalt coated and saturated felt. Potassium silicate will serve instead of sodium silicate and the color may be in whole or in part applied to the granules, by making a water suspended color, and mixing it with the slate before the silicate step.

I have found that in any instance in which silicate is employed in applying a permanent color, it is much the best in commercial practice to apply the colors as follows:

The mineral matter, usually granulated slate, is placed in a dry condition in a mixer. Then into this mixer is dumped the pigmenting agent called for and the mineral matters are first mixed up dry. Thereupon water is added and finally a water dissolved silicate is added to the mixer. The proportions given will be the best for the colors I have described.

Then when the mineral and pigment powder are thus mixed in a dry state, I provide for a more uniform color and get a better effect all the way round. Among other things I avoid the chance of the pigment settling out of the silicate in the operation of coating the granules with the silicate, preparatory to roasting. This is the method of obtaining a pigment-silicate suspension which I have found most advantageous in practice. The language of the claims is intended to cover all pigment-silicate suspensions whether preformed, or formed upon the surface of the mineral matter.

Having thus described my invention, what I claim as new and desire to secure by Letters Patent, is:—

1. In a process of coloring mineral granules, those steps which consist in wetting mineral granules sufficiently to coat them with a water solution of silicate together with an insoluble pigment in minute division, and then roasting the mineral with agitation, to a heat which shows a reddish color.

2. In a process of coloring mineral granules, those steps which consist in wetting mineral granules sufficiently to coat them with a water solution of silicate together with ultramarine blue pigment, and then roasting the mineral with agitation, to a heat which shows a reddish color.

3. In a process of coloring mineral granules, those steps which consist in wetting mineral granules sufficiently to coat them with a water solution of silicate together with ultramarine blue pigment and a pigment of another color, and then roasting the mineral with agitation, to a heat which shows a reddish color.

4. In a process of coloring granulated green slate, those steps which consist in wetting the granulated green slate with a solution containing silicate and ultramarine blue, sufficiently to coat the granules, and then roasting the granules with agitation to dehydrate the silicate sufficiently to form on the granules a whitish body of silicate in which the ultramarine blue is suspended in finely divided particles.

HARRY C. FISHER.